United States
Kato et al.

[11] 3,709,606
[45] Jan. 9, 1973

[54] DEVICE FOR ADJUSTING ANGLE OF INCLINATION OF REFERENCE MIRROR FOR INTERFEROMETER

[75] Inventors: Jinichi Kato; Toshiharu Shimizu, both of Tokyo, Japan

[73] Assignee: Nippon Kogaku K.K., Tokyo, Japan

[22] Filed: Aug. 26, 1970

[21] Appl. No.: 67,070

[30] Foreign Application Priority Data

Aug. 30, 1969 Japan.........44/81897

[52] U.S. Cl....................................356/109, 350/202
[51] Int. Cl..................................G01b 9/02
[58] Field of Search......................350/202; 356/106–113

[56] References Cited

UNITED STATES PATENTS

| | | | |
|---|---|---|---|
| 2,743,645 | 5/1956 | Larsson et al. | 356/109 |
| 3,433,569 | 3/1969 | Francis | 356/109 |
| 3,045,535 | 7/1962 | Jacquinot et al. | 356/112 |
| 3,074,315 | 1/1963 | Seibel et al. | 350/26 X |

*Primary Examiner*—John K. Corbin
*Attorney*—Harry G. Shapiro

[57] ABSTRACT

A device for adjusting the angle of inclination of an interferometer reference mirror having a mirror holding member connected to a support member which is adapted to be slideably connected to an objective lens tube. The angle of inclination of the mirror holding member with relation to the support member and the objective lens is adjusted by adjusting members connecting the mirror holding and support members. The device is made slidable relative to the objective lens, so that the adjustment of the spacing and the direction of the interference fringes is carried out without damaging the specimen and the reference mirror. The replacement of the reference mirror and the objective lens may be made easily. The adjustment of the holding member for obtaining the interference fringes by multi-beam interference may be accomplished easily. Further, the device may be applied not only to multibeam interferometers but also to the objective lens part of a microscopes.

5 Claims, 3 Drawing Figures

PATENTED JAN 9 1973

3,709,606

INVENTORS
JINICHI KATO
AND
BY TOSHIHARU SHIMIZU

Harry G. Shapiro
ATTORNEY

DEVICE FOR ADJUSTING ANGLE OF INCLINATION OF REFERENCE MIRROR FOR INTERFEROMETER

BACKGROUND OF THE INVENTION

The present invention relates to a device for adjusting an angle of inclination of a reference mirror for interferometers.

In the conventional interferometer, especially in a multi-beam interferometer, various measurements are made by utilizing the phenomenon, that the interference fringes which are obtained due to a slightly wedge-shaped space between a specimen and a reference mirror, appear in the horizontal plane with the spacing between the fringes being $\lambda/2$ (half the wavelength of the reflected light). To obtain such interference fringes, the spacing between the specimen and the reference mirror must be extremely small and a very extremely small angle must be formed therebetween. Therefore, the conventional device for such spacing and angular adjustment had the following defects:

I. For spacing adjustment, first the reference mirror is put in contact with the specimen and then moved away therefrom so as to provide a very small spacing therebetween so that the specimen or reference mirror or both tend to be damaged if considerable care is not exercised. Further, when the specimen is soft, it tends to be deformed;

II. The device for adjusting the angle of inclination of the reference mirror is made integral with the main body of an interferometer so that a change in magnification is inconvenient because the objective lens is also incorporated in the main body, and moving the objective lens moves the reference mirror. The changes of various types of objective lenses and reference mirrors are also very inconvenient.

III. The device of the conventional type is generally designed exclusively for use on interferometers so that it may not be employed in an optical instrument having the same fundamental optical system as that of the interferometer such as metallurgical microscopes, dissecting microscopes, etc; and IV. The conventional device is complex in operation and adjustment.

SUMMARY OF THE INVENTION

An object of present invention is to eliminate these defects.

The invention comprises a supporting member which is fitted over an objective lens tube, a reference mirror holder holding a reference mirror, and adjustment members interposed between the supporting member and the reference mirror holding member to couple both of them and to incline the reference mirror holding member with relation to the supporting member.

According to the present invention, the objective lens is not made integral with the reference mirror inclination adjustment device, but instead is slidable relative to the objective lens so that undesired force is not applied to the specimen, the objective lens or the reference mirror when the spacing between the fringes and the direction thereof are adjusted so that the damage to the specimen and the reference mirror may be prevented. Focusing may be made independently of the reference mirror inclination adjustment device and the specimen, and the replacement of the reference mirror and the objective lens may be easily accomplished. Depending upon the hardness of the specimen, the pressure applied thereto may be varied thereby preventing the deformation of the specimen. The adjustment for obtaining the interference fringes by multi-beam interference may be accomplished in a simple manner, The device of the present invention may be applied not only to the multi-beam interferometer but also to a metallurgical microscope so as to determine the surface smoothness and to measure the length by multi-beam interference. The device of the present invention is compact in size, simple in construction and manufacture and inexpensive.

BRIEF DESCRIPTION OF THE DRAWING

The present invention will be more apparent from the following explanation, referring to the embodiment shown in the accompanying drawings in which.

DESCRIPTION OF THE PREFERRED EMBODIMENTS

Figure 1:
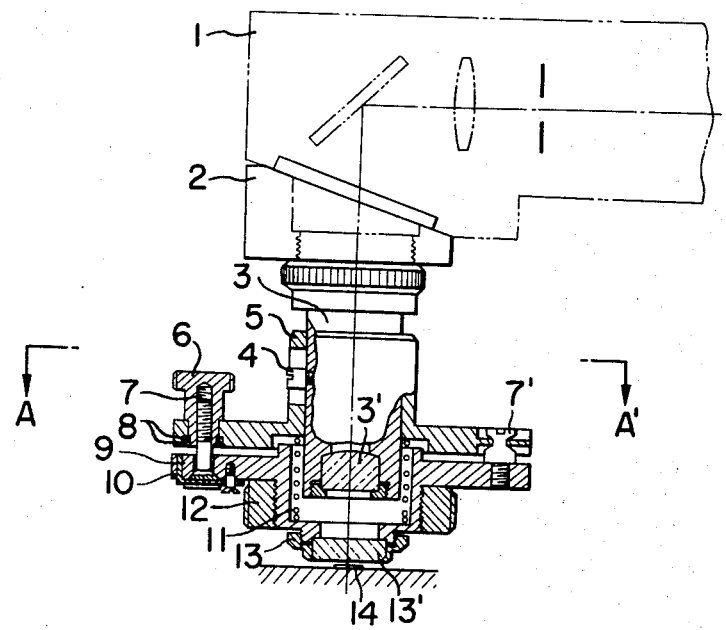
FIG. 1 is a front sectional view of one embodiment of the present invention.
Figures 2, 3:
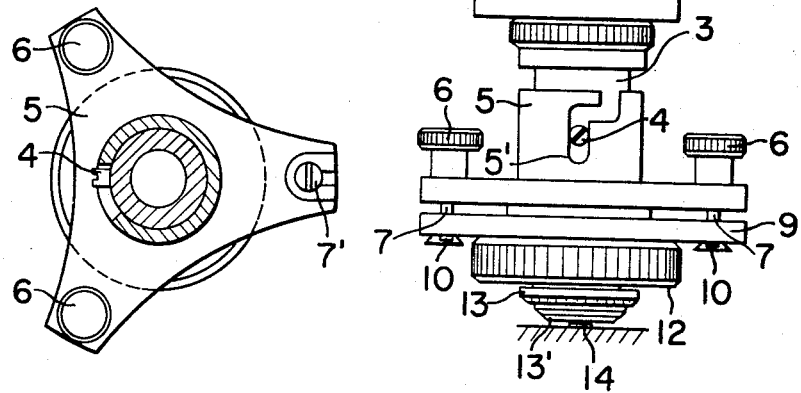
FIG. 2 is a view looking in the direction of the arrows A–A' in FIG. 1.
FIG. 3 is a side view thereof.

Referring to FIG. 1, FIG. 2, and FIG. 3, an objective lens holder 2 is detachably fitted into a main body 1 of a microscope through a dovetail joint. Reference numeral 3 designates a tube for an objective 3'; 4, a guide pin extended from the objective lens tube 3; 5, a supporting member, is fitted to the objective lens tube, and is guided for vertical sliding movement by the guide pin 4; and 5' a guide slot into which the guide pin is fitted. An adjustment handle 6 is in threaded engagement with an adjustment screw 7 so as to slightly incline a reference mirror 13' to be described, the adjustment handle 6 being rotatably about the supporting member 5 while the adjustment screw 7 is vertically moved by rotation of the adjustment handle 6. Locknuts 8 fix the adjustment handle 6 to the supporting member 5 for rotation. A hinge 7' serves to give a slight inclination to the reference mirror 13' and together with the two adjustment handles 6, each has one end engaged to a reference mirror holder 9, to be described, and its the other end mounted to the supporting member 5. Instead of the hinge 7', a third adjustment handle 6 may be employed. The adjustment members are constituted by the adjustment handles 6, the adjustment screws 7, the locknuts 8, the hinge 7' and a stopper 10 to be described.

Element 9 is a reference mirror holder, one end thereof fitted with the hinge 7' and the other two ends thereof provided with adjustment screws 7 which are able to pivot slightly about the holder 9. The stopper 10 prevents the rotation of the adjustment screw 7, and is fixed to the reference mirror holder 9. A spring 11 is interposed between the supporting member 5 and the reference mirror holder 9 so as to remove the play between the adjustment handle 6 and the adjustment screw 7, A weight 12 is detachably fixed over the holder 9 so that the suitable weight 12 may be used depending upon the hardness of a specimen. The reference mirror 13' having the same reflectivity as that of the specimen 14 is fixed to the holder 9 by means of a retaining ring 13, so that the reference mirror 13' may be readily replaced when damaged. The reference mirror inclination adjustment device is constituted by the supporting member 5, the adjustment handles 6, the adjustment screw 7, the hinge 7', the locknuts 8, the reference mirror holder 9, the stoppers 10, the spring 11, the weight 12, the retaining ring 13, and the reference mirror 13'.

Next the mode of operation will be described. The main body 1 of the microscope is lowered toward the specimen 14 through focusing means (not shown) so as to place upon the specimen the reference mirror inclination adjustment device. Next focusing may be made by the focusing means of the microscope (fine adjustment in practice) by shifting the main body 1, the objective lens holder 2 and the objective lens 3' independently of the reference mirror inclination adjustment device. With the reference mirror inclination device placed upon or very close the specimen 14, the interference fringes are formed because the distance between the two is of the order of $\lambda/2$. Thus, when focused correctly, the interference fringes due to multi-beam interference may be observed with high contrast. By adjusting the handles 6, the spacing between the fringes and the direction of the fringes may be arbitrarily varied because the angle of the reference mirror 13' relative to the specimen 14 may be varied by the two adjustment handles 6. The objective lens 3' may be moved from the proper position for observation and independently of the reference mirror inclination adjustment device within the range in the vertical direction in which the guide pin 4 may move in the guide slot 5' of the supporting member 5 to provide a "safe objective lens effect". Thus, focusing may be made with ease. Furthermore, the reference mirror inclination adjustment device may be easily attached to and detached from the objective lens tube 3. It is only necessary to provide the guide pin 4 in the tube or in the extreme case the objective lens tube 3 may be fitted into the supporting member 5 without providing the guide pin 4.

Therefore, multi-beam interference may be obtained in a simple manner by using an ordinary objective lens.

When the main body 1 and the lens holder 2 are joined together through an inclined dovetail joint, the replacement of the objective lenses and the device may be made without causing any damage to the specimen. Furthermore, the device may be used for various types of objective lenses having various powers.

What is claimed is

1. A device for adjusting the angle of inclination of a reference mirror for interferometers comprising objective lens holding means; support means mounted on the objective lens holding means; cooperable guide slot and projection means provided by the objective lens holding means and the support means for relative sliding movement in a direction parallel to the optical axis of the objective lens; reference mirror holding means; and adjusting means connecting the reference mirror holding means to the support means for adjustment of the angle of inclination of the reference mirror holding means with respect to the support means and thereby with respect to the objective lens holding means.

2. The device for adjusting the angle of inclination of a reference mirror for interferometers according to claim 1 wherein the objective lens holding means comprises a lens tube; wherein the support means includes a tubular portion surrounding the lens tube and the adjusting means comprises a member threadably connected to one of the reference mirror holding means and support means and is pivotally connected to the other of the reference mirror holding means and support means.

3. The device for adjusting the angle of inclination of a reference mirror for interferometers according to claim 2 wherein the adjusting means further comprise hinge means connecting the support means and the reference mirror holding means.

4. The device for adjusting the angle of inclination of a reference mirror for interferometers according to claim 2 wherein the guide slot is provided in the tubular portion of the support means, and the projection means is provided on the lens tube.

5. The device for adjusting the angle of inclination of a reference mirror for interferometers according to claim 4 further comprising resilient means between the reference mirror holding means and the support means.

* * * * *